United States Patent Office 3,562,038
Patented Feb. 9, 1971

3,562,038
METALLIZING A SUBSTRATE IN A SELECTIVE PATTERN UTILIZING A NOBLE METAL COLLOID CATALYTIC TO THE METAL TO BE DEPOSITED

Charles R. Shipley, Jr., Newton, and Michael Gulla, Framingham, Mass., assignors to Shipley Company, Inc., Newton, Mass., a corporation of Massachusetts
No Drawing. Filed May 15, 1968, Ser. No. 729,431
Int. Cl. B44d *1/18;* C23b *5/62*
U.S. Cl. 156—3 51 Claims

ABSTRACT OF THE DISCLOSURE

A process for the deposition of electroless metal on selected areas of a substrate using a colloidal catalyst solution of a metal catalytic to the electroless metal to sensitize the substrate. The catalyst is preferably a noble metal-stannic acid colloid and most preferably a palladium-stannic acid colloid. The process takes advantage of the discovery that the surface of a substrate may be treated to absorb and/or retain a colloidal catalyst to a greater extent than an untreated surface. The process, in one of its simplest embodiments, comprises providing a substrate having treated and untreated surface areas, sensitizing the substrate with a colloidal catalyst, contacting the subsubstrate with a stripper for the adsorbed colloidal catalyst for a time sufficient to strip substantially all of the adsorbed colloid from the untreated surface areas and insufficient to strip the adsorbed colloid from the treated surfaces, and depositing electroless metal selectively over the treated areas of the substrate. The process is especially well adapted for the formation of printed circuit boards and is particularly useful for forming conductive through holes between surfaces of a printed circuit board.

BACKGROUND OF THE INVENTION

(1) Field of the invention

This invention relates to the deposition of electroless metal on a nonconductive substrate and has for its principal object, the deposition of electroless metal in a selected pattern over a substrate using a colloidal catalyst of a metal catalytic to the electroless metal to sensitize the surface of the substrate.

(2) Description of the prior art

Electroless metal deposition refers to the chemical plating of a metal over an active surface by chemical means in the absence of an external electric current. Such processes and compositions useful therefor are known and are in substantial commercial use. They are disclosed in a number of prior art patents, for example U.S. Pat. Nos. 3,075,856; 3,119,709; 3,075,855; and 3,011,920.

To deposit electroless metal over a nonconductive or semiconductive substrate, it is necessary to sensitize the surface of the substrate to provide catalytic nucleating centers for the deposition of electroless metal. This can be accomplished by immersion of the substrate in a bath containing stannous chloride or other stannous salts followed by immersion in a salt of a metal catalytic to the deposition of the desired metal coating such as silver nitrate or the chlorides of gold, palladium or platinum these metal ions being reduced to catalytic metal nucleating centers by the stannous ions adsorbed on the substrate, and thereafter depositing the desired metal such as copper, nickel, etc. Alternatively, the substrate can be treated with a catalyst comprising a colloid of a metal catalytic to the desired deposition metal such as the colloids of palladium, platinum, gold and the like as disclosed in the above noted U.S. Pat. No. 3,011,920.

In the manufacture of articles using electroless deposition procedures, it is frequently desirable to deposit the electroless metal only in selected areas. For example, in coating a plastic substrate for decorative purposes, it is frequently desirable to plate only one side of a plastic substrate or alternatively, only a portion of one surface in a selected pattern. To accomplish this, it is necessary to provide a mask, usually of a resinous material, over that portion of the plastic substrate wherein deposition is not desired prior to immersion in the catalytic material. Thereafter, the mask is removed and electroless metal is deposited.

In the manufacture of printed circuit boards, it is necessary to provide a metal layer in a selective circuit pattern. Various methods are available for accomplishing this, typically starting with an insulating plastic core, preferably clad with copper foil on one or both of its surfaces. Using a known photographic process, the copper foil is coated with a positive light-sensitive photoresist material and exposed to actinic light under a master. The so exposed composite is then developed with a solution that dissolves the light-sensitive coating material from the light exposed areas, but not from the areas under the opaque portion of the master. If a negative master is used, copper foil is exposed in a negative pattern of the desired circuit. The exposed copper is etched by immersion of the composite in a solvent for copper such as ferric chloride. The remainder of the light sensitive material may then be stripped from the composite leaving copper foil in a printed circuit pattern. If desired, a thicker deposit can be provided by electroplating.

Where additive circuit boards are desired, or a printed circuit pattern is required on both surfaces of a printed circuit board, it is necessary to provide conductive paths through the insulating core, thereby providing a conductive path through a plurality of circuit boards or between two surfaces of a single circuit board. To accomplish this, additional steps are required. One process involves first coating the surface of an otherwise completed circuit board with a masking material. Holes are then drilled or punched through the board and the entire composite is sensitized using the above noted sensitizing compositions. The masking material is then removed and the walls of the holes are metal plated using known electroless deposition procedures. Caution must be exercised to avoid a buildup of deposited metal along the edges of the holes on the surface of the circuit board. The overall process for making printed circuit boards in accordance with these procedures is unduly long and expensive.

An improved process for metallizing insulating base materials and forming printed circuit boards is disclosed in U.S. Pat. No. 3,347,724. In accordance with this procedure, an insulating core material is made catalytic to the reception of an electroless deposit by coating with an ink containing catalytic material to provide a catalytic laminate. The catalytic ink comprises an adhesive resin base having particles of catalytic agents dispersed throughout disclosed as finely divided titanium, aluminum, copper, iron, cobalt, zinc, titanous oxide, copper oxide and mixtures thereof. The preferred catalytic material is copper oxide which is reported to be reduced by treatment with an acid subsequent to coating the insulating base material. By rendering the surface of the insulating material catalytic in this manner, a light-sensitive photoresist may then be coated over the entire composite, exposed and developed and finally electrolessly metal plated in an image pattern. Where through holes are desired, the holes are drilled or punched and impregnated with the catalytic ink. Thereafter, they are receptive to electroless metal deposition.

The process of U.S. Pat. No. 3,347,724 overcomes many of the problems of the prior art, but also possesses various disadvantages. For example, using the catalytic laminate of the patent, catalytic particles which act as nucleating centers for electroless deposition are insulated from each other by regions of resin binder. Also, many of the catalytic particles are covered with a coating of the resin binder. Consequently, to obtain complete coverage by electroless copper, the deposition period is excessively long, and frequently exceeds two hours. In addition, electroless deposition begins at the catalytic nucleating centers and spreads outward. Because of the insulating regions of resin between catalytic particles, the electroless deposit is not smooth, but consists of minute hills and valleys. To overcome this deffciency, it is necessary to put a thicker coating of copper uniformly over the printed circuit board resulting in a further loss of time with increased cost. As a further disadvantage to this process, the inclusion of catalytic particles in the catalytic laminate may degrade to some extent, the dielectric properties of the resin insulating material.

STATEMENT OF THE INVENTION

The present invention provides the advantages gained through the use of a catalytic laminate while avoiding the disadvantages associated therewith. The invention is predicated upon the discovery that the surface of a substrate may be treated as by mechanical roughening or chemical treatment to adsorb and/or retain a colloidal catalyst to a greater extent than an untreated substrate. Making use of this effect, the surface of a substrate may be treated in a desired pattern, sensitized by contact with a colloidal catalyst, preferably stripped of colloidal catalyst in untreated areas of the substrate, and plated with electroless metal to provide metal deposition in a desired pattern. Where printed circuit boards having through holes are desired, the process of drilling or punching the through holes in the insulating substrate mechanically roughens the surfaces thereof sufficiently to provide increased colloid retention, thereby permitting selective electroless metal deposition on the walls of the through holes.

DESCRIPTION OF THE PREFERRED EMBODIMENTS

In one of the simplest embodiments of this invention, the overall process for depositing electroless metal in a selective pattern over a nonconducting or semiconducting substrate comprises the following sequence of steps:

(1) Provide a substrate having treated and untreated surface areas, the treated areas comprising a desired pattern for electroless metal deposition and having the additional capability of adsorbing and/or retaining colloidal catalyst to a greater extent than untreated areas;

(2) Sensitize the substrate with a colloidal metal solution of a metal catalytic to the deposition of the electroless metal, preferably a stannic acid-palladium colloid.

(3) Contact the substrate with a stripper for the colloid for a time sufficient to selectively strip substantially all of the colloid from the untreated surface areas and insufficient to strip all of the colloid from the treated surface areas, and treated surface areas thereby being sensitized to deposition of electroless metal, and (4) Deposit electroless metal over the substrate, the metal depositing only in the treated surface areas that retain adsorbed colloid to provide a metal deposit in a desired pattern.

The substrates in accordance with this invention are formed from approximately the same class of materials as those contemplated in the above noted U.S. Pat. No. 3,011,920.

The object of treatment in step (1) above is to provide a surface capable of adsorbing and/or retaining colloidal catalyst to a greater extent than an untreated surface. By providing a surface of this nature, colloidal catalyst is adsorbed over the entire substrate and may thereafter be stripped from the untreated surface with sufficient catalyst retained on the treated surface for electroless metal deposition. If the treated surface is in a desired pattern, electroless deposition will take place only over the treated surface that retains catalyst to provide a metallized surface in a desired pattern.

A preferred treatment involves roughening of the substrate surface in a desired pattern to provide rough and smooth surface areas. It is believed that the roughened surface areas adsorb a greater concentration of colloidal catalyst due to increased surface area and retain adsorbed colloidal catalyst to a greater extent than the smooth surface areas due to the inability of the stripping solution to enter and remove the colloidal particles from the pores and depressions on the roughened surface. Due to these factors, substantially all of the colloid may be stripped from the smooth surfaces with sufficient colloid retained on the rough surfaces to permit electroless deposition.

Roughening of the substrate surface can be accomplished either mechanically or chemically. Mechanical roughening procedures are well known in the art and include sanding, sandblasting, abrading with a grit, etc. Mechanical roughening is a simple procedure, but results in relatively large irregularities that may require a thicker deposit of electroless metal for a smooth finish.

Chemical treatment of the substrate may take many forms. For example, a plastic substrate may be contacted with a solvent to cause roughening or deglazing of the surface. Procedures for deglazing plastic preparatory to metal plating are well known in the art and described in numerous publications including Products Finishing, April 1966, at pages 63, et seq., and Product Finishing, April 1964, pages 147, et seq. Suitable solvents for various plastics are set forth in detail by J. Brandrup et al., Polymer Handbook, Interscience Publishers, 1966, IV–185. All of the aforesaid publications are included herein by reference. An additional chemical treatment step involves contact with a concentrated chromic acid, sulfuric acid solution.

Using a treatment step that involves roughening of the substrate, it is relatively simple to selectively deposit electroless metal over a single surface of a substrate. The entire surface of the substrate is roughened using one of the above noted procedures, contacted with a colloidal metal catalyst, contacted with a stripping solution whereby catalyst is stripped from the smooth surface of the substrate with sufficient catalyst retained on the rough surface for metal deposition and metal plated. Where metal deposition in an intricate pattern is desired, one method involves roughening of the entire surface of the substrate as a first step. Next, a negative of a desired pattern is coated onto the roughened surface. This can be accomplished in a number of ways including silk screening, offset printing and photographic procedures using light sensitive photoresist material. These procedures and materials useful therefore are well known in the art and described in detail in U.S. Pats. Nos. 3,267,861; 3,146,125; and 3,269,861; all incorporated herein by reference. Once the desired negative pattern is coated onto the substrate, the composite is immersed in colloidal catalyst, immersed in a stripper for a time sufficient to strip the adsorbed catalyst from the coating material and insufficient to strip the colloidal catalyst from the exposed roughened surface in the desired pattern. Selective electroless deposition may then be carried out over the roughened, sensitized surface.

There are additional chemical methods for treating the substrate to render it more adsorptive and/or rententive of colloidal catalyst. For example, the substrate may be coated by offset printing, silk screening or the like in a negative or positive pattern with a material, preferably a resin, having adsorption and/or retention properties for the colloidal catalyst differing from those of the substrate. If a negative of the desired pattern is coated onto the substrate, the coating material should dry to a finish that is harder and smoother than that of the substrate. Adsorbed colloidal catalyst will be preferentially stripped from the coating and retained in a positive pattern on the substrate. Alternatively, the coating material may contain positively or negatively charged functional groups, the ion exchange resins being exemplary of suitable coating materials. A cation exchange resin would tend to repel the positively charged colloidal particles thereby resulting in a surface that is low in colloid concentration while an anion exchange resin would attract the positively charged colloidal particles thereby resulting in a surface having a high concentration of colloidal particles. An additional chemical process involves treatment of portions of the substrates to render it hydrophobic so as to obtain greater colloid adsorption on the nontreated surface. This can be accomplished by coating with a hydrophobic material such as wax or a thin film of a hydrophobic resin such as polyethylene, polypropylene, polystyrene, etc. Oxidation of the substrate, in a selected pattern, such as by treatment with a permanganate solution, also results in a decrease of adsorption of colloid.

The colloidal catalyst suitable for purposes of the present invention is of a metal catalytic to the electroless metal to be deposited. Suitable colloids and process for their formation are disclosed in U.S. Pat. No. 3,011,920 incorporated herein by reference. Palladium colloids stabilized with stannic acid colloids are preferred A most preferred composition is as follows:

Example 1

$PdCl_2$—1 gm.
Water—600 ml.
HCl (conc.)—300 ml.
$SnCl_2$—50 gm.

The above ingredients can be added in the order listed or the addition of the stannous chloride and palladium chloride can be reversed. Colloidal palladium is slowly formed by the reduction of the palladium ions by the stannous chloride. Simultaneously, stannic acid colloids are formed, together with adsorbed stannic chloride. The stannic acid colloids comprise protective colloids for the palladium colloids while the oxychloride constitutes a deflocculating agent further promoting the stability of the resulting colloidal solution. The relative amounts of the above ingredients can be varied provided the pH is below about 1 and provided an excess of stannous ions is maintained. The solution can also be made more concentrated or can be further diluted, preferably with additional hydrochloric acid of sufficient strength to maintain the pH below about 1.

The immersion of the composite in the colloid results in greater adsorption and/or retention of the colloidal catalyst on the treated surface of the substrate than on the untreated surface. The time of immersion is not critical; periods of from 1 to 15 minutes being suitable.

The stripper solution is preferably a peptizing agent for the colloid. The mechanism by which it removes adsorbed catalyst is not fully understood, but probably involves, to some extent, repeptization of the colloid and possibly dissolution. Due to differences between various substrates, some routine experimentation with adjustment of such variables as time, temperature, concentration, etc. may be required. Typical strippers include, by way of example, dilute solutions of hydrochloric acid, acidified ferric chloride, oxalic acid, sodium hydroxide, sodium carbonate, etc. Preferred compositions are as follows:

Example 2

| | Gm. |
|---|---|
| Citric acid | 20 |
| Oxalic acid | 30 |
| Sodium bisulfate | 10 |
| Water to 1 liter. | |

Example 3

| | Gm. |
|---|---|
| Ferric chloride | 5 |
| Hydrochloric acid (37%) | 100 |
| Water to 1 liter. | |

Example 4

| | |
|---|---|
| Sodium perborate | 5 |
| Hydrochloric acid (37%) | 100 |
| Water to 1 liter. | |

Example 5

| | |
|---|---|
| Copper chloride | 10 |
| Hydrochloric acid (37%) | 100 |
| Water to 1 liter. | |

The above solutions are preferably used at room temperature. The time of immersion in the stripper is that time necessary to strip substantially all of the colloidal catalyst from the untreated surface of the substrate and insufficient to strip all of the colloidal catalyst from the treated surface. This time is, to a large extent, dependent upon the relative adsorption and retention properties of the treated and untreated surfaces of the substrate and the time of immersion in the colloidal solution. In general, this time can be ascertained by routine experimentation. For the composition of Example 2, from 2 to 10 minutes immersion in a solution maintained at from 90 to 110° F. is generally satisfactory.

Electroless deposition of a plating metal may be carried out using techniques well known to the art and exemplified in the above noted U.S. patents. A suitable composition for copper deposition is as follows:

Example 6

| | Gm. |
|---|---|
| $CuSo_4 \cdot 5H_2O$ | 10.0 |
| Formaldehyde | 9.3 |
| NaOH | 25.0 |
| Ethylenediaminetetraacetic acid | 25.0 |
| Water to 1 liter. | |

The copper deposits over the treated surfaces that adsorb and/or retain colloid. No copper deposits over the untreated surfaces stripped of colloid. Electroless nickel solutions are also suitable for purposes of the invention.

It should be understood that the above procedures for selective metallization may be varied to a large extent making use of the ability to strip adsorbed colloid from treated surfaces more readily than from the untreated surfaces. For example, the surface of a substrate may be treated following printing of a mask in a desired pattern followed by removal of the mask and immersion in solutions of the catalyst, stripping solution and electroless metal, respectively.

When it is desired to manufacture a printed circuit board using an unclad substrate, the above procedures are satisfactory. If through holes are required in the printed circuit board, they may be drilled or punched as a first step. This roughens the walls of the holes sufficiently to cause greater adsorption and/or retention of the colloidal catalyst on the walls of the through holes than on the remainder of the substrate. As a result, the walls of the holes are catalytic to the deposition of electroless metal following the procedures of the invention while the remainder of the substrate is noncatalytic. It is to be noted that following this procedure, there is no buildup of a metal deposit around the edges of the holes on the surface of the board as is frequently encountered following electroplating procedures. This is an advantage as it results in improved performance and decreased space requirements.

The process of this invention is also useful for formation of printed circuit boards using copper clad laminates. In one embodiment, the holes are drilled or punched as a first step, contacted with colloidal catalyst with excess being stripped from the smooth surfaces, and plated with electroless metal to provide conductive through holes. The board is then processed in conventional manner to provide a circuit pattern on the copper clad. The result is a printed circuit board having conductive through holes possessing the advantages noted above.

The invention will be further illustrated by the following examples. In all of the examples, a palladium metal-stannic acid colloid identified as Catalyst 6F available from Shipely Company was used as catalyst.

Example 7

One surface of a phenolic sheet having a thickness of about 1/16" is roughened by sandblasting. The sheet is then immersed in the colloidal catalyst maintained at room temperature for a period of approximately 5 minutes. The sheet is then immersed in the stripping composition of Example 2 maintained at room temperature for five minutes. This is followed by electroless copper deposition to provide a phenolic sheet having copper deposited on only one of its surfaces.

Example 8

The procedure of Example 7 was repeated with immersion of the catalyzed substrate in the stripping composition maintained at room temperature for one minute. Electroless deposition of copper takes place over both surfaces of the substrate due to insufficient immersion time in the stripping composition with failure to strip all adsorbed catalyst from the smooth surface.

Example 9

The procedure of Example 7 was repeated with immersion in the stripper composition of Example 3 maintained at room temperature for two minutes, all other steps remaining the same. Electroless copper deposited only on the roughened surface with no deposition on the smooth surface.

Example 10

The procedure of Example 7 was repeated with immersion in the stripper composition of Example 4 maintained at room temperature for 5 minutes, all other steps remaining the same. Copper deposited over the roughened surface, but failed to deposit on the smooth surface.

Example 11

The procedure of Example 10 was repeated with immersion in the stripping composition of Example 4 for one minute. Copper deposited over both surfaces of the substrate.

Example 12

The procedure of Example 7 was repeated with immersion in the stripper composition of Example 5 maintained at room temperature for two minutes, all other steps remaining the same. Electroless copper deposited only on the roughened surface with no deposition on the smooth surface.

Example 13

One surface of a phenolic sheet having a thickness of about 1/16" is roughened by a vapor honing process comprising subjecting one surface of the sheet to a jet of steam containing finely divided pumice. The sheet is then immersed in the colloidal catalyst maintained at room temperature for a period of approximately 5 minutes. The sheet is then immersed in the stripping composition of Example 5 maintained at room temperature for three minutes. This is followed by electroless copper deposition to provide a phenolic sheet having copper deposited only on the vapor honed surface.

Example 14

Repeat procedure of Example 13 with roughening of surface by sanding with fine sandpaper rather than vapor honing. Copper deposits only on sanded surface.

Example 15

Repeat procedure of Example 13 with roughening of surface by scrubbing with a stiff brush and pumice. Copper deposits only on roughened surface.

Example 16

Holes having a diameter of 1/8" are drilled through a 1/16" phenolic sheet at selected locations. The sheet is then immersed in colloidal catalyst maintained at room temperature for a period of approximately four minutes. The sheet is then immersed in the stripping composition of Example 5 maintained at room temperature for three minutes. This is followed by electroless copper deposition to provide a phenolic sheet having copper deposited only on the walls of the holes roughened by drilling. No copper deposits on the smooth surfaces.

Example 17

The procedure of Example 16 is repeated with punching of the holes rather than drilling. Copper deposits only on the walls of the holes.

Example 18

A phenolic sheet is cut along one edge with a saw, immersed in the colloidal catalyst maintained at room temperature for five minutes, immersed in the stripping solution of Example 3 maintained at room temperature for three minutes and immersed in an electroless copper solution. Copper deposits on the edge roughened by sawing with no deposition taking place on the smooth surfaces.

Example 19

Repeat procedure of Example 18 with shearing of edge substituted for the step of sawing. Copper deposits only on the sheared edge.

Example 20

Part I: Immerse phenolic sheet in the trichloroethylene for a time sufficient to deglaze the surface. Then immerse in colloidal catalyst maintained at room temperature for a period of approximately five minutes. The sheet is then immersed in the stripping composition of Example 2 for five minutes followed by immersion in the electroless copper solution. Copper deposits over this entire surface of the substrate.

Part II: Repeat with immersion of only one half of the phenolic sheet in the hot trichloroethylene. Copper deposits only on that half of the sheet immersed in the trichloroethylene.

Part III: Repeat with omission of immersion in trichloroethylene. No copper deposition takes place.

Example 21

Sand blast an entire surface of a plastic sheet and silk screen a desired pattern of an epoxy resin over the roughened surface. Bake the sheet at a temperature of approximately 150° C. for a time sufficient to cure the epoxy. Immerse the so prepared sheet in colloidal catalyst maintained at room temperature for about five minutes and then in the stripping composition of Example 5 maintained at room temperature for five minutes. Deposit electroless copper. Copper depostis on the roughened surface, but not on the silk screened epoxy resin.

Example 22

Repeat procedure of Example 21 preparing the pattern using a light sensitive photoresist material identified as KPR–2 available from Eastman Kodak Co. Copper deposits only on the sandblasted surfaces.

Example 23

Repeat procedure of Example 21 preparing a pattern using a light sensitive photoresist material identified as AZ–111 available from Shipley Company and containing a diazo compound baked at 275° F. for 60 minutes as light sensitive material. Copper deposits only on the sandblasted surface.

Example 24

Repeat procedure of Example 23 substituting electroless nickel for electroless copper. Nickel deposits only on the sandblasted surface.

Example 25

Process for the formation of a one-sided through-hole circuit board from a plastic laminate copper clad on one surface.

(a) Silk screen a reverse image of a printed circuit pattern onto a substrate using an epoxy resin composition with baking to cure the resin.

(b) Drill holes in appropriate locations.

(c) Prepare copper cladding for bonding by cleaning with a copper cleaner and etching with a solution comprising approximately 30 grams of copper chloride, 330 milliliters of hydrochloric acid and water to one liter.

(d) Immerse in 33% hydrochloric acid solution.

(e) Immerse in palladium-stannic acid colloid solution maintained at room temperature for about 5 minutes.

(f) Immerse in stripping solution of Example 3 maintained at room temperature for two minutes.

(g) Deposit electroless copper of Example 6. Copper deposits in the through-holes and on the copper cladding, but not on the unclad surface of the substrate where it would be undesirable.

(h) Electroplate with copper to desired thickness.

(i) Electroplate with a lead-tin alloy.

(j) Remove epoxy coating.

(k) Etch with dilute chromic acid solution to remove copper cladding from undesired areas.

Example 26

Process for making a one-sided through-hole printed circuit board using a plastic substrate having copper cladding on one surface only.

(a) Silk screen a reverse image of a printed circuit pattern onto a substrate using an epoxy resin composition.

(b) Drill through-holes in appropriate locations.

(c) Immerse in palladium-stannic acid colloid maintained at room temperature for five minutes.

(d) Immerse in stripping solution of Example 5 maintained at room temperature for five minutes.

(e) Deposit electroless copper of Example 6 for a period of time sufficient to deposit copper to full desired thickness.

(f) Deposit electroless nickel over copper deposit to a thickness of about .0002".

(g) Remove the epoxy coating.

(h) Etch the copper clad from the substrate using an ammonium persulfate etchant.

Example 27

The procedure of Example 26 is repeated using a two-sided copper clad laminate.

Example 28

Process for making a one-sided through-hole printed circuit board using a plastic substrate copper clad on one surface only.

(a) Print image of a printed circuit pattern using a light sensitive photoresist identified as AZ–111 and containing a diazo compound as light sensitive compound.

(b) Etch exposed copper clad using a ferric chloride etchant.

(c) Remove the light sensitive photoresist material.

(d) Print an epoxy nonselective resist over the etched circuit side of the board.

(e) Drill through-holes in desired locations.

(f) Immerse in palladium-stannic acid colloid maintained at room temperature for 5 minutes.

(g) Immerse in stripping solution of Example 5 maintained at room temperature for 5 minutes.

(h) Deposit electroless copper of Example 6 in through-holes for a period of time sufficient to deposit copper to full desired thickness.

(i) Remove nonselective resist (optional).

Example 29

Repeat procedure of Example 28 with a two-sided copper clad laminate.

Example 30

Repeat procedure of Example 28 with the substitution of electroless nickel for electroless copper.

Example 31

Repeat procedure of Example 28 including the printing of small rings around the through-holes.

Example 32

Process for making a one-sided circuit board using a smooth unclad plastic substrate.

(a) Sandblast one side of the substrate leaving the second side smooth.

(b) Silk screen a reverse image of printed circuit pattern onto the roughened surface using an epoxy resin.

(c) Immerse in colloidal stannic acid-palladium catalyst maintained at room temperature for 5 minutes.

(d) Immerse in the stripping solution of Example 5 maintained at room temperature for 6 minutes.

(e) Deposit electroless copper of Example 6 to a full thickness. Copper deposits only in the through-holes and on the roughened surfaces in the image pattern. No copper deposition takes place on the resist or on the smooth side of the plastic laminate.

(f) Remove epoxy coating (optional).

Example 33

Repeat the process of Example 32 with roughening of both surfaces of the plastic sheet to provide a two-sided circuit board.

Example 34

Repeat the procedure of Example 32 with deposition of electroless nickel instead of electroless copper.

Example 35

Repeat procedure of example of example 32 with the substitution of a stannic acid-gold colloid for the palladium colloid.

Example 36

Process for making a one-sided circuit board using a smooth unclad plastic substrate.

(a) Abrade one surface of the substrate leaving the second side smooth.

(b) Silk screen a reverse image of a printed circuit pattern onto the roughened surface using an epoxy resin resist.

(c) Immerse in colloidal stannic acid-palladium catalyst maintain at room temperature for 5 minutes.

(d) Immerse in the stripping solution of Example 5 maintained at room temperature for 8 minutes.

(e) Deposit electroless copper of Example 6 with deposition taking place in the through-holes and on the roughened surfaces.

(f) Deposit electrolytic copper over the electroless copper making contact with the electroless copper circuit.

(g) Remove resist (optional).

Example 37

Repeat procedure of Example 36 using both sides of substrate.

Example 38

Process for making a one sided through-hole printed circuit board using unclad substrate.

(a) Abrade one surface of the substrate leaving the second surface smooth.

(b) Print a reverse image of a printed circuit pattern onto the roughened surface using an epoxy resin resist and offset printing procedures.

(c) Pierce through-holes at appropriate locations.

(d) Immerse in colloidal stannic acid-palladium catalyst maintained at room temperature for 5 minutes.

(e) Immerse in the stripping solution of Example 5 maintained at 90° F. for 4 minutes.

(f) Deposit electroless copper of Example 6 to full thickness with deposition taking place in the through-holes and on the roughened surfaces.

(g) Remove resist (optional).

Example 39

Repeat procedure of Example 38 using both surfaces of substrate.

Example 40

Repeat procedure of Example 38 including step of electroplating copper subsequent to step of electroless plating of copper.

Example 41

Repeat procedure of Example 38 using a mixed stannic acid-gold-palladium colloid.

Obviously, changes and modification may be made to the specific embodiments disclosed without departing from the spirit and scope of the invention as defined by the claims.

What is claimed is:

1. A process for preparing a substrate for electroless metal deposition in a selected image pattern comprising the steps of providing a substrate having portions of its surface in a desired image pattern selectively more retentive of an adsorbed colloid than the remaining surface of the substrate, contacting the substrate with a solution of a noble metal colloid catalytic to the metal to be deposited electrolessly, and contacting the substrate with a stripper for the noble metal colloid for a time insufficient to strip all of the noble metal colloid from the retentive surface of the substrate and sufficient to strip substantially all of the noble metal colloid from the remainder of the substrate surface, whereby the desired image pattern is catalytic to the deposition of electroless metal.

2. The process of claim 1 where the colloid is a stannic acid-noble metal catalyst.

3. The process of claim 2 where the noble metal is gold.

4. The process of claim 2 where the noble metal is platinum.

5. The process of claim 2 where the noble metal is a mixture of gold and palladium.

6. The process of claim 2 where the noble metal is palladium.

7. The process of claim 6 where the desired image pattern is formed by mechanical roughening of the image areas.

8. The process of claim 6 where the substrate is a plastic and the desired image pattern is formed by deglazing the surface of the plastic in an image pattern by contact with a solvent for said plastic.

9. The process of claim 6 where the desired image pattern is formed by coating the nonimage areas with a lacquer.

10. The process of claim 6 where the desired image pattern is formed by coating the nonimage areas with a hydrophobic material.

11. The process of claim 6 where the desired image pattern is formed by contacting nonimage areas of the substrate with an oxidizing agent.

12. The process of claim 6 where the adsorbed colloid is stripped from the surface of the substrate with a stripper that is a peptizing agent for the noble metal colloid.

13. The process of claim 6 including a final step of electroless metal deposition.

14. The process of claim 6 where the electroless metal is selected from the group of copper and its alloys.

15. The process of claim 6 where the electroless metal is selected from the group of nickel and its alloys.

16. The process of claim 6 where one entire surface of the substrate is roughened and printed with a mask in a negative image pattern prior to contact with the colloidal metal solution.

17. The process of claim 16 where the mask is printed by silk screening.

18. The process of claim 16 where the mask is printed by offset printing.

19. The process of claim 16 where the mask is printed using a photographic procedure wherein the substrate is coated with a light-sensitive material, exposed to actinic light through a master and developed.

20. The process of claim 16 where the mask is a permanent mask not removed as a final step.

21. A process for making a printed circuit board by metallizing in a selected pattern from an electroless metal solution comprising the steps of providing a substrate having portions of its surface in a circuit pattern selectively more retentive of an adsorbed colloid than the remaining portion of the substrate, contacting the substrate with a solution of a noble metal colloid catalytic to the metal to be deposited electrolessly, contacting the substrate with a stripper for the noble metal colloid for a time insufficient to strip all of the noble metal colloid from the retentive surface of the substrate and sufficient to strip substantially all of the noble metal colloid from the remainder of the substrate surface, whereby the circuit pattern is catalytic to the deposition of electroless metal and depositing electroless metal over the catalytic surface.

22. The process of claim 21 where the colloid is a stannic acid-noble metal colloid.

23. The process of claim 22 where the noble metal is palladium.

24. The process of claim 23 where the desired circuit pattern is formed by mechanical roughening.

25. The process of claim 23 where adsorbed colloid is stripped from the surface of the substrate with a stripper that is a peptizing agent for the colloid.

26. The process of claim 23 further including the step of providing through-holes in the substrate prior to contact of the substrate with the colloid.

27. The process of claim 23 where both surfaces of the substrate are treated.

28. The process of claim 23 where electroless metal is deposited to full desired thickness.

29. The process of claim 23 including electroplating to full desired thickness as a final step.

30. The process of claim 23 where the electroless metal is selected from the group consisting of copper and nickel and their alloys.

31. The process of claim 30 where the electroless metal is copper.

32. The process of claim 23 where the substrate is mechanically roughened over at least one entire surface and a mask of a material that dries to a smooth, relatively hard surface is printed over the roughened surface in a reverse image of a circuit pattern prior to contact of the substrate with the colloid.

33. The process of claim 32 where the mask is printed over the roughened surface by offset printing.

34. The process of claim 32 where the mask is printed over the roughened surface by silk screening.

35. A process for forming conductive through-holes in a printed circuit board by deposition of an electroless metal comprising the steps of forming through-holes, contact of the printed circuit board with a solution of a noble metal colloid catalytic to the metal to be deposited electrolessly, contact of the printed circuit board with a stripper for the noble metal colloid for a time sufficient to strip substantially all of the noble metal colloid from all areas of the printed circuit board except the walls of the through-holes and depositing electroless metal.

36. The process of claim 35 where the colloid is a stannic-acid noble metal colloid.

37. The process of claim 36 where the noble metal is palladium.

38. The process of claim 37 where the through-holes are punched in the printed circuit board at desired locations.

39. The process of claim 37 where the through-holes are drilled through the printed circuit board at desired locations.

40. The process of claim 37 where the electroless metal is selected from the group of copper, nickel and their alloys.

41. The process of claim 37 where the colloid is stripped from the walls of the through-holes with a stripper that is a peptizing agent for the noble metal colloid.

42. The process of claim 37 where the metal clad is copper.

43. The process of claim 42 including a sequence of steps comprising printing a mask in a reverse image pattern on the copper clad, drilling through-holes at desired locations, contacting with colloid, contacting with noble metal stripping composition whereby noble metal colloid is stripped from all surface except the walls of the through-holes, electroless deposition of copper on the walls of the through-holes and the copper clad, electroplating of copper to desired thickness, electroplating with dissimilar metal, removal of the mask and etching of exposed copper clad.

44. The process of claim 43 where both surfaces are copper clad and a printed circuit pattern is provided on both surfaces.

45. The process of claim 42 including a sequence of steps comprising printing a mask in a reverse image pattern on the copper clad, drilling through-holes at desired locations, contacting with noble metal colloid, contacting with stripper compositions whereby noble metal colloid is stripped from all surfaces except the walls of the through-holes, electroless deposition of copper to full thickness, removal of the mask and etching of exposed copper clad.

46. The process of claim 45 where both surfaces are copper clad and a printed circuit pattern is provided on both surfaces.

47. The process of claim 42 including a sequence of steps comprising printing a mask in a desired printed circuit pattern, etching of exposed copper clad, removal of the mask, printing of a non-selective mask over the surface of the printed circuit board, drilling through-holes at desired locations, contacting with noble metal colloid, contacting with stripper composition whereby noble metal colloid is stripped from all surfaces except the walls of the through-holes and electroless deposition of copper to full desired thickness.

48. The process of claim 47 where both surfaces are copper clad and a printed circuit pattern is provided on both surfaces.

49. A process for preparing a substrate for electroless metal deposition in a selected image pattern comprising the steps of providing a substrate having portions of its surface in a desired image pattern selectively more retentive of an adsorbed colloid than the remaining surface of the substrate, contacting the substrate with a solution of a noble metal colloid catalytic to the metal to be deposited electrolessly, and contacting the substrate with a stripper for the noble metal colloid for a time insufficient to strip all of the noble metal colloid from the rententive surface of the substrate and sufficient to strip substantially all of the noble metal colloid from the remainder of the substrate surface, said stripper being selected from the group consisting of an admixture of cupric chloride, hydrochloric acid and water, an admixture of citric acid, oxalic acid, sodium bisulphate and water, and an admixture of ferric chloride, hydrochloric acid and water, whereby the desired image pattern is catalytic to the deposition of electroless metal.

50. A process for making a printed circuit board by metallizing in a selected pattern from an electroless metal solution comprising the steps of providing a substrate having portions of its surface in a circuit pattern selectively more rentenitive of an adsorbed colloid than the remaining portion of the substrate, contacting the substrate with a solution of a noble metal colloid catalytic to the metal to be deposited electrolessly, contacting the substrate with a stripper for the noble metal colloid for a time insufficient to strip all of the noble metal colloid from the retentive surface of the substrate and sufficient to strip substantially all of the noble metal colloid from the remainder of the substrate surface, said stripper being selected from the group consisting of an admixtrue of citric acid, oxalic acid, sodium bisulphate and water, an admixture of cupric chloride, hydrochloric acid and water, and an admixture of ferric chloride, hydrochloric acid and water, whereby the circuit pattern is catalytic to the deposition of electroless metal and depositing electroless metal over the catalytic surface.

51. A process for forming conductive through-holes in a printed circuit board by deposition of an electroless metal comprising the steps of forming through-holes, contact of the printed circuit board with a solution of a noble metal colloid catalytic to the metal to be deposited electrolessly, contact of the printed circuit board with a stripper for the noble metal colloid for a time sufficient to strip substantially all of the metal colloid from all areas of the printed circuit board except the walls of the through-holes, said stripper being selected from the group consisting of an admixture of citric acid, oxalic acid, sodium bisulphate and water, and admixture of ferric chloride, hydrochloric acid and water and an admixture of cupric chloride, hydrochloric acid and water, and depositing electroless metal.

References Cited

UNITED STATES PATENTS

| | | | |
|---|---|---|---|
| 3,011,920 | 12/1961 | Shipley | 117—213 |
| 3,075,856 | 1/1963 | Lukes | 117—212X |
| 3,134,690 | 5/1964 | Eriksson | 117—212X |
| 3,296,012 | 1/1967 | Stalnecker | 117—47 |
| 3,326,719 | 6/1967 | Beltzer et al. | 117—213 |
| 3,347,724 | 10/1967 | Schneble et al. | 156—151 |
| 3,406,036 | 10/1968 | McGrath et al. | 117—160X |
| 3,437,507 | 4/1969 | Jensen | 117—47 |
| 3,442,683 | 5/1969 | Lenoble et al. | 117—213X |
| 3,466,232 | 9/1969 | Francis et al. | 117—47X |
| 3,472,678 | 10/1969 | Bruins et al. | 117—47 |

JOHN T. GOOLKASIAN, Primary Examiner

J. C. GIL, Assistant Examiner

U.S. Cl. X.R.

117—8, 47, 160, 212, 213; 156—7, 8, 150, 151